(12) United States Patent
Bahr

(10) Patent No.: US 8,440,082 B2
(45) Date of Patent: May 14, 2013

(54) METHOD AND APPARATUS FOR THE SOLID-LIQUID-SEPARATION OF MATERIAL MIXTURES AND SUSPENSIONS

(76) Inventor: Albert Bahr, Ottweiler (DE)

( * ) Notice: Subject to any disclaimer, the term of this patent is extended or adjusted under 35 U.S.C. 154(b) by 0 days.

(21) Appl. No.: 13/616,512

(22) Filed: Sep. 14, 2012

(65) Prior Publication Data

US 2013/0001150 A1  Jan. 3, 2013

Related U.S. Application Data

(62) Division of application No. 12/557,893, filed on Sep. 11, 2009, now Pat. No. 8,366,942.

(30) Foreign Application Priority Data

Sep. 15, 2008  (DE) .......................... 10 2008 047 427

(51) Int. Cl.
  *B01D 33/044* (2006.01)
  *C02F 11/12* (2006.01)

(52) U.S. Cl.
  USPC ........... 210/295; 210/400; 210/396; 210/408; 210/770; 210/783; 210/808; 100/37; 100/121

(58) Field of Classification Search ........................ None
  See application file for complete search history.

(56) References Cited

U.S. PATENT DOCUMENTS

| | | | | |
|---|---|---|---|---|
| 4,168,236 A | * | 9/1979 | Bahr | 210/294 |
| 4,181,616 A | * | 1/1980 | Bahr | 210/297 |
| 4,343,233 A | * | 8/1982 | Burgin | 100/116 |
| 4,346,653 A | * | 8/1982 | Rodak | 100/37 |
| 4,660,608 A | * | 4/1987 | Arai | 141/12 |
| 5,292,434 A | * | 3/1994 | Benesi | 210/770 |
| 5,366,626 A | * | 11/1994 | Pierson | 210/216 |
| 5,413,703 A | * | 5/1995 | Greenwald, Sr. | 210/205 |
| 5,428,906 A | * | 7/1995 | Lynam et al. | 34/379 |
| 5,462,677 A | * | 10/1995 | Benesi | 210/791 |
| 5,510,025 A | * | 4/1996 | Benesi | 210/227 |
| 5,718,059 A | * | 2/1998 | Banerjee et al. | 34/398 |
| 5,863,429 A | * | 1/1999 | Bahr | 210/385 |
| 5,961,827 A | * | 10/1999 | Bahr | 210/387 |
| 6,099,725 A | * | 8/2000 | Silverstein et al. | 210/227 |
| 6,110,388 A | * | 8/2000 | Norais et al. | 210/770 |
| 6,159,359 A | * | 12/2000 | Benesi | 210/87 |
| 6,322,693 B1 | * | 11/2001 | Southall | 210/85 |

(Continued)

FOREIGN PATENT DOCUMENTS

EP  0 264 900 A2 * 10/1987

*Primary Examiner* — Robert James Popovics
(74) *Attorney, Agent, or Firm* — Brinks Hofer Gilson & Lione

(57) ABSTRACT

Method for the liquid solid separation of material mixtures and suspensions in which the material mixture under pressure is fed into a closed chamber having at least one filter surface and a hydrostatic pressure is generated within said chamber for separating the liquid phase. After separating the liquid phase the chamber is opened and the filter surface together with the filter cake is removed from said chamber. The material mixture firstly is treated by the means of hydrostatic pressure of about up to 0.2 bar, wherein 80 to 90% of the fed volume is removed as filtrate. Thereafter the concentrated remaining volume is drawn off and is further treated in the closed chamber with a pressure of up to 5 bar. By reducing the volume of the chamber finally with a pressure of up to 50 bar the remaining filtrate is separated.

2 Claims, 8 Drawing Sheets

U.S. PATENT DOCUMENTS

Figure 1:
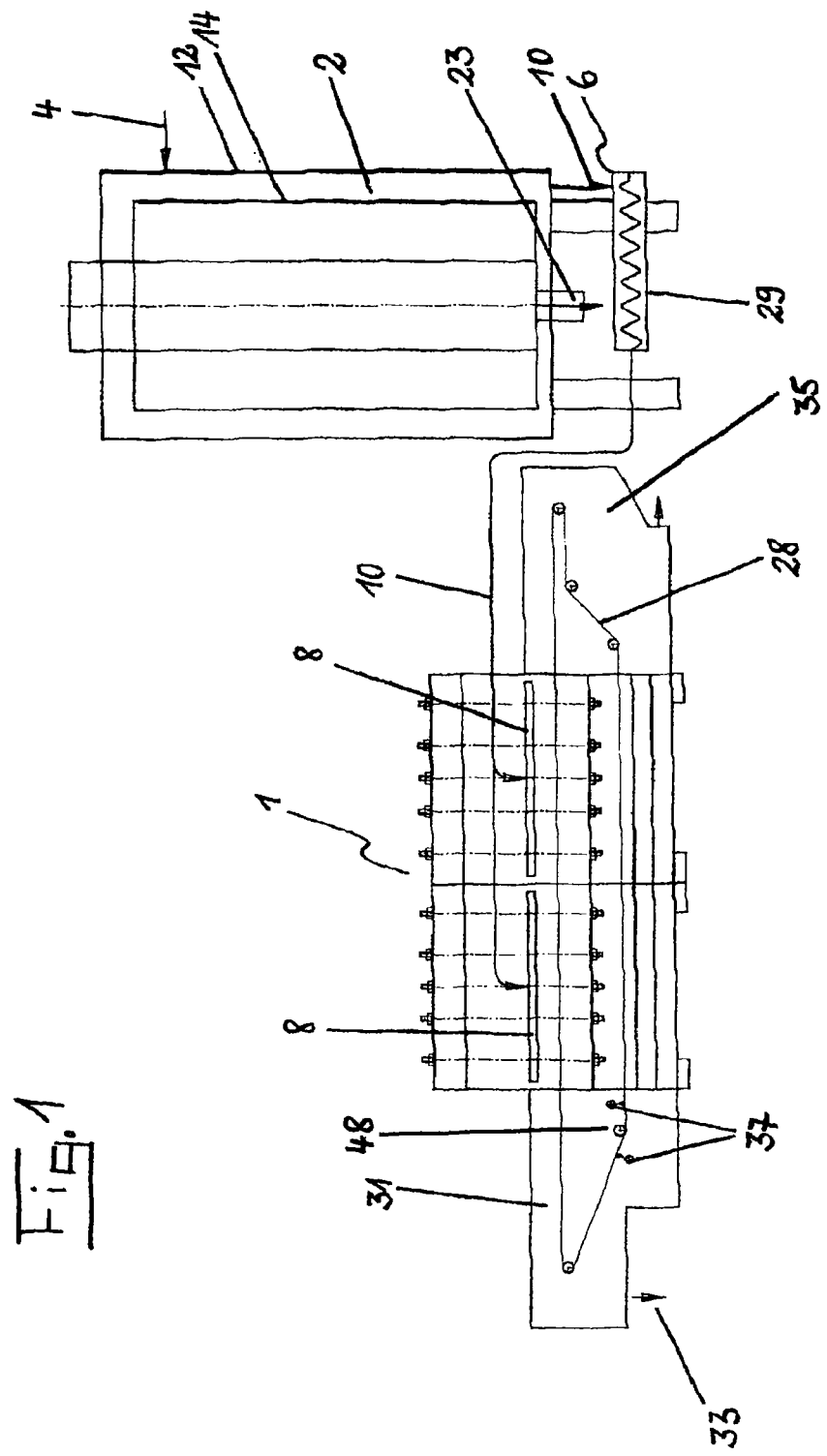

| | | | |
|---|---|---|---|
| 6,395,187 B1* | 5/2002 | Alanis | 210/758 |
| 6,454,102 B2* | 9/2002 | Thompson | 210/386 |
| 6,651,822 B2* | 11/2003 | Alanis | 210/394 |
| 6,673,247 B2* | 1/2004 | Olson | 210/710 |
| 7,299,745 B2* | 11/2007 | Nelson et al. | 100/110 |
| 7,381,329 B1* | 6/2008 | Moss | 210/255 |
| 7,383,766 B2* | 6/2008 | McIntosh et al. | 100/92 |
| 7,396,435 B2* | 7/2008 | DeZutter et al. | 162/52 |
| 7,410,568 B2* | 8/2008 | Christopherson | 210/97 |
| 7,439,004 B2* | 10/2008 | Malachowski et al. | 430/137.1 |
| 7,531,086 B2* | 5/2009 | Benesi et al. | 210/143 |
| 7,662,296 B2* | 2/2010 | Pancaldi et al. | 210/770 |
| 7,906,029 B2* | 3/2011 | Sugaya et al. | 210/709 |
| 7,964,105 B2* | 6/2011 | Moss | 210/770 |
| 7,989,011 B2* | 8/2011 | Newkirk et al. | 426/489 |
| 8,017,021 B1* | 9/2011 | Staples | 210/773 |
| 8,025,156 B2* | 9/2011 | Tapp | 210/414 |
| 8,038,916 B2* | 10/2011 | Nakamura | 264/109 |
| 8,070,960 B2* | 12/2011 | Conwell | 210/702 |
| 8,197,680 B2* | 6/2012 | Sharir | 210/108 |
| 8,361,313 B2* | 1/2013 | Pancaldi et al. | 210/106 |
| 8,366,942 B2* | 2/2013 | Bahr | 210/770 |
| 2001/0013497 A1* | 8/2001 | Kolber | 210/747 |
| 2002/0043505 A1* | 4/2002 | Olson | 210/749 |
| 2004/0168986 A1* | 9/2004 | Katano | 210/695 |
| 2004/0237809 A1* | 12/2004 | McIntosh et al. | 100/117 |
| 2005/0067123 A1* | 3/2005 | DeZutter et al. | 162/52 |
| 2005/0139093 A1* | 6/2005 | Nelson et al. | 100/37 |
| 2005/0167373 A1* | 8/2005 | Pancaldi et al. | 210/791 |
| 2006/0102545 A1* | 5/2006 | Benesi et al. | 210/224 |
| 2006/0273047 A1* | 12/2006 | Newkirk et al. | 210/780 |
| 2007/0256984 A1* | 11/2007 | Benesi et al. | 210/741 |
| 2008/0053916 A1* | 3/2008 | Taki et al. | 210/728 |
| 2008/0078726 A1* | 4/2008 | Pancaldi et al. | 210/770 |
| 2008/0110838 A1* | 5/2008 | Moss | 210/783 |
| 2008/0169248 A1* | 7/2008 | DeWaard | 210/747 |
| 2009/0057235 A1* | 3/2009 | Sugaya et al. | 210/709 |
| 2009/0090256 A1* | 4/2009 | Mealey, Jr. | 100/126 |
| 2009/0250385 A1* | 10/2009 | Sharir | 210/143 |
| 2010/0012573 A1* | 1/2010 | Dendel et al. | 210/360.2 |
| 2010/0032384 A1* | 2/2010 | Moss | 210/770 |
| 2010/0065514 A1* | 3/2010 | Bahr | 210/769 |
| 2010/0096336 A1* | 4/2010 | O'Reilly | 210/710 |
| 2010/0096341 A1* | 4/2010 | Benesi | 210/771 |
| 2010/0147766 A1* | 6/2010 | Nissen et al. | 210/660 |
| 2010/0213137 A1* | 8/2010 | Sugaya et al. | 210/709 |
| 2011/0084029 A1* | 4/2011 | O'Reilly | 210/711 |
| 2011/0089097 A1* | 4/2011 | O'Reilly | 210/225 |
| 2011/0094395 A1* | 4/2011 | O'Reilly | 100/37 |
| 2011/0203999 A1* | 8/2011 | Simpson et al. | 210/710 |
| 2011/0297016 A1* | 12/2011 | Yamashita et al. | 100/145 |
| 2012/0018361 A1* | 1/2012 | Nakamura | 210/141 |
| 2012/0097607 A1* | 4/2012 | Merai | 210/609 |
| 2012/0193305 A1* | 8/2012 | Jass et al. | 210/771 |
| 2012/0261351 A1* | 10/2012 | O Rathallaigh | 210/711 |
| 2012/0305460 A1* | 12/2012 | Sharir | 210/106 |
| 2013/0001150 A1* | 1/2013 | Bahr | 210/327 |
| 2013/0015115 A1* | 1/2013 | Landis et al. | 210/202 |
| 2013/0015141 A1* | 1/2013 | Landis et al. | 210/710 |

* cited by examiner

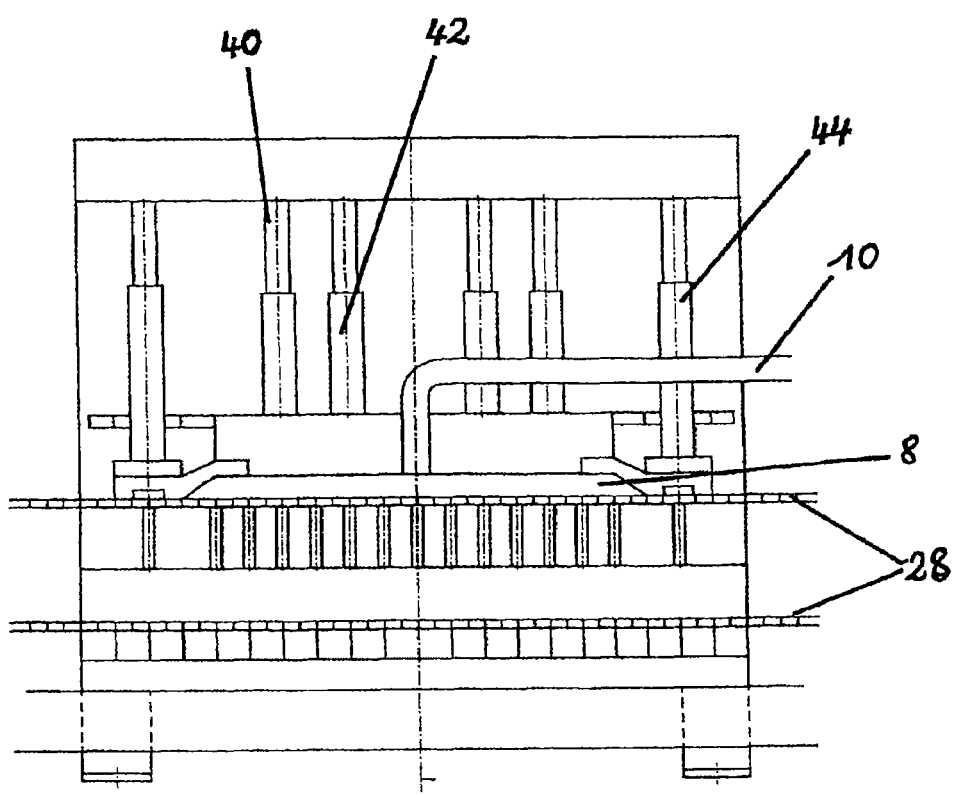

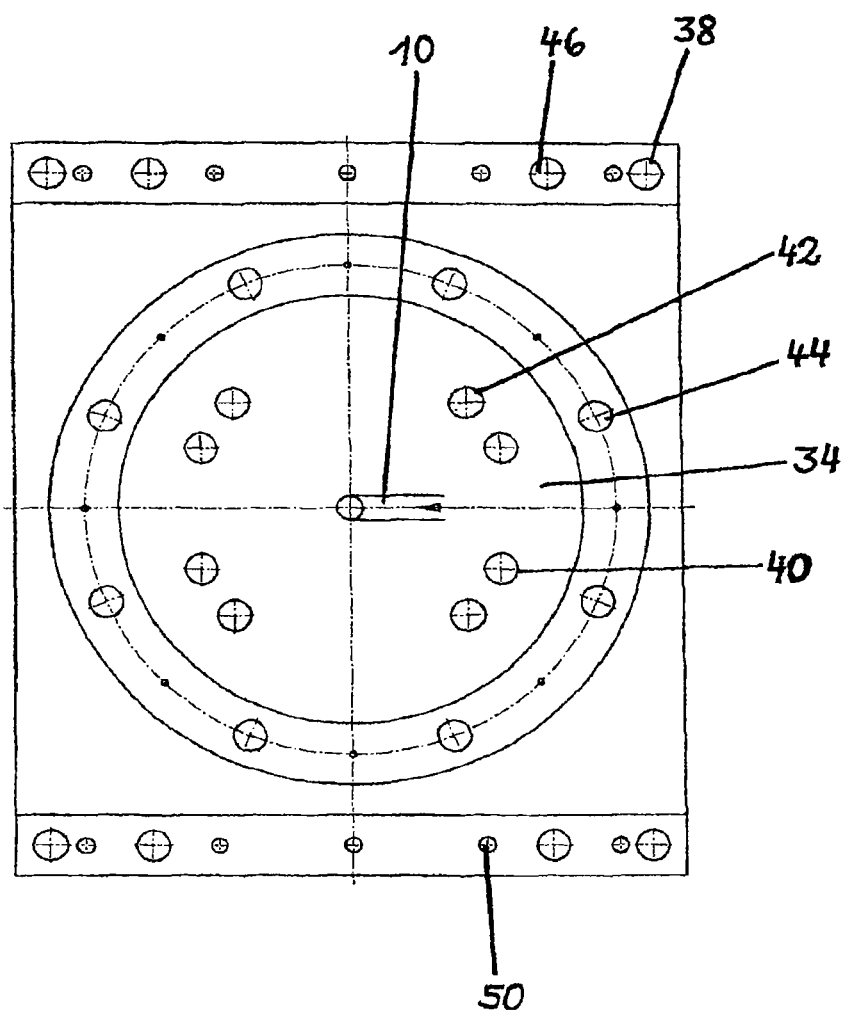

METHOD AND APPARATUS FOR THE SOLID-LIQUID-SEPARATION OF MATERIAL MIXTURES AND SUSPENSIONS

RELATED APPLICATIONS

The present application is a divisional of U.S. patent application Ser. No. 12/557,893, filed Sep. 11, 2009, which is also incorporated herein by reference in its entirety.

The invention relates to a method of the solid-liquid-separation of material mixtures and suspensions, in which the material mixture is fed under pressure into a closed chamber having at least one filter area and, in which within said chamber a hydrostatic pressure is created causing the separation of the liquid phase, wherein after the separation of the liquid phase the chamber is opened for removing the filter cake produced and the filter area with the filter cake is conveyed out of said chamber. Further, the invention relates to an apparatus for carrying out this method.

It is generally known to treat material mixtures and suspensions in chamber filter presses for separating the liquid phase. For example, sludge and similar substances as the sludge obtained in waste water cleaning installations after the addition of organic or an organic flocculation agents or filtering aid agents is dewatered in this way. In connection with chamber filter presses of the usual construction, the sludge is fed into completely closed filter chambers, wherein for the dewatering of the material mixtures by the means of pumps with high pressures it is pumped until the desired contents of dry matter is achieved. The liquid phase contained in the material mixture or suspension in this connection is removed through the dividing walls of the singular filter chambers consisting of filter material. The disadvantage of known chamber filter presses of this kind of construction and the procedure associated therewith for separating the liquid phase is consisting in the fact that with an extremely high technical expenditure the efficiency with which the pressure is transferred to the material mixture or the suspension from which the liquid phase should be separated is decreasing in the conveying direction from chamber to chamber. A further disadvantage of the known chamber filter presses is consisting in the discontinuous working procedure since during the opening of the filter chambers the feeding of the material mixture has to be interrupted. Further, it comes as an additional difficulty that the entire separation of the liquid phase including a pre-dewatering at a very low pressure is done in one chamber which is designed for high pressures which means that the same is utilized in an extremely uneconomical way.

Starting out from this prior art, it is the task to be solved by the present invention to provide a completely novel method for the solid-liquid-separation and an apparatus suitable for performing this method in which with a low technical expenditure a substantially improved efficiency and additionally a substantially improved through-put is achieved.

With a method of the above defined kind, this task basically is solved by the features that the material mixture firstly is treated by the means of hydrostatic pressure of about up to 0.2 bar, wherein 80 to 90% of the fed volume is removed as filtrate, that thereafter the concentrated remaining volume is drawn off and is treated further in the closed chamber with the pressure up to 5 bar and that by decreasing the volume of the chamber finally the remaining filtrate is separated with a pressure of up to 50 bar.

By means of these method steps, the advantage is achieved that the respective stage of the separation of the fluid phase can be done in an optimally way matched to this purpose such that the chambers designed for a high pressure treatment due to the already substantially decreased volume of the material mixture merely are utilized for the separation under high pressure.

It is especially preferred to feed the material mixture during the treatment with hydrostatic pressure continuously and to carry out the further treatment batch-wise. In this way, the advantages of continuously working systems are combined with the high dewatering pressure of discontinuously working systems such that an optimal way of work is achieved.

In an especially preferred embodiment according to the invention, in the closed chamber after the high pressure treatment the filter cake obtained is washed and the washing liquid used again is separated under high pressure. By these features the method according to the invention is especially suitable to be used in combination with material mixtures in which the filter cake in a desired purity of the material mixture is the desired final product. To this end, there are existing numerous examples in the chemical and pharmaceutical industry.

An especially preferred embodiment according to the invention can be created by the features that the separation under hydrostatic pressure is done in one stage and the treatment of the drawn off remaining volume simultaneously is carried out in a plurality of parallel chambers performed as squeeze-pressure chambers. By this feature it becomes possible to feed the material mixture continuously into the first stage and because of the significant decrease of the entire volume in the first stage the further separation of the fluid phase can be performed batch-wise in the parallel squeeze-pressure chambers. Additionally in this way a simple adjustment to the capacity, i.e. the desired through-put, is possible.

In detail, it is of advantage that the squeeze-pressure chambers are simultaneously opened after the end of the solid-liquid-separation and that the obtained filter cake is carried out by means of a movable filter belt. By these features the cycle time of the method stage working discontinuously is substantially shortened and an especially economic construction is obtained.

In detail, it is of advantage in this connection to carry out the solid matter cake by means of the filter belt from the one or more squeeze-pressure chambers horizontally.

Further it is preferred to wash the filter belt after the ejection of the solid matter cake.

Further it is preferred to provide a washing water nozzle manifold to clean the filter cloth at the end of the shift.

An especially preferred embodiment according to the invention can be created by the features that each squeeze-pressure chamber is performed as a compact separated, closed and individual constructive member. By this feature, a modular construction is formed by the means of which it is possible to match the through-put performance to the demand by simply increasing the number of such individual constructive members.

Consequently an especially preferred embodiment of the apparatus according to the invention is consisting of the features that in a modular construction a plurality of squeeze-pressure chambers parallel to each other are connected to the material mixture feed-line from the pumping device and that a circulating filter belt is running through all squeeze-pressure chambers.

A further preferred feature according to the invention is consisting in the fact that the pumping device is performed as a worm extruder. By this feature an especially economical construction is created due to the fact that a simple worm extruder is sufficient to feed all squeeze-pressure chambers.

In detail the invention advantageously can be further improved that each squeeze-pressure chamber is having the following constituents:

A lower fixed squeeze-pressure plate, an upper fixed counter-pressure plate, an upper risable and lowerable squeeze-pressure plate having a surrounding seal, tie rods between the lower squeeze-pressure plate and upper counter-pressure plate to take the tension forces and hydraulic cylinders to move the upper squeeze-pressure plate together with the seal.

The squeeze-pressure chamber preferably is surrounded by the annular flexible seal fixed to the upper liftable and lowerable squeeze-pressure plate, wherein the seal by means of hydraulic pretension cylinders is movable in the direction of the lower squeeze-pressure plate and can be pretensioned under pressure. By this feature, it is possible to ensure a safe sealing of the squeeze-pressure plate depending from the pressure used for the separation of the fluid phase by correspondingly increasing the contact pressure of the seal onto the lower fixed squeeze-pressure plate.

Further it is preferred to provide limiting cylinders to limit the closing movement of the pressure plates.

To enable a kind of process in which the solid material cake, before the removal from the squeeze-pressure chambers, is washed again preferably a washing device for the solid material cake is provided in the squeeze-pressure chambers by the means of which a washing liquid can be introduced into the already pressed solid material cake which thereafter is again separated by a further high pressure dewatering.

Figure 2:
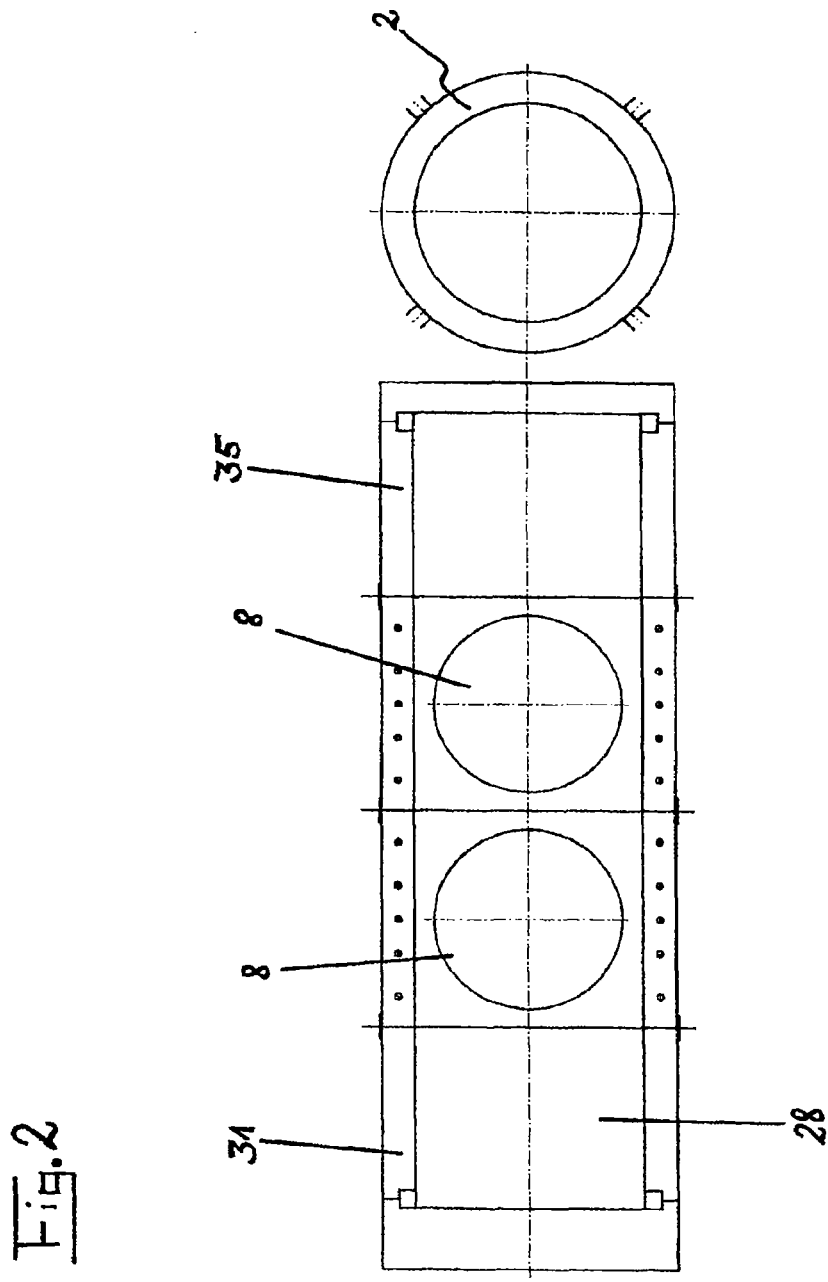
Figure 3:
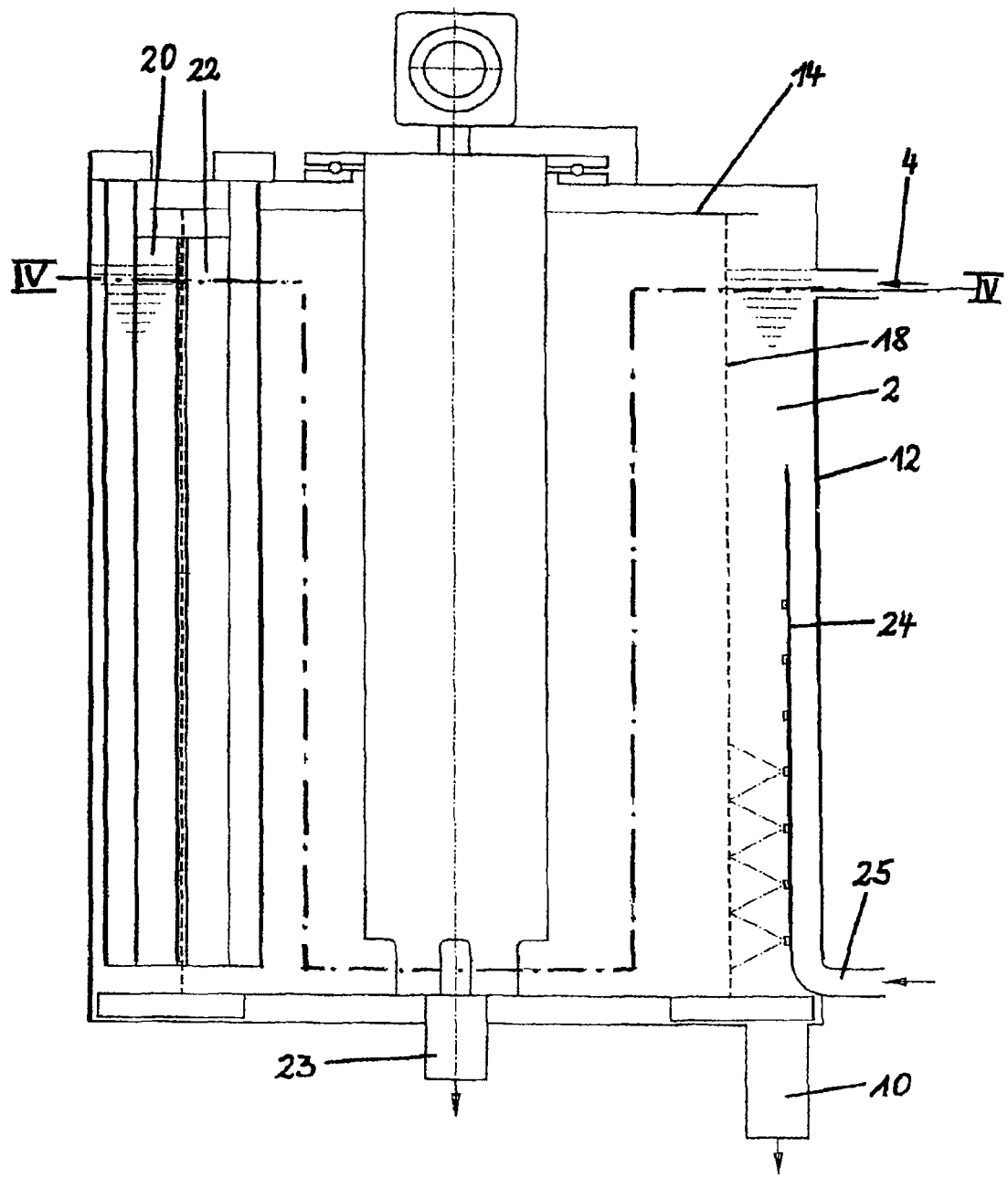
Figure 4:
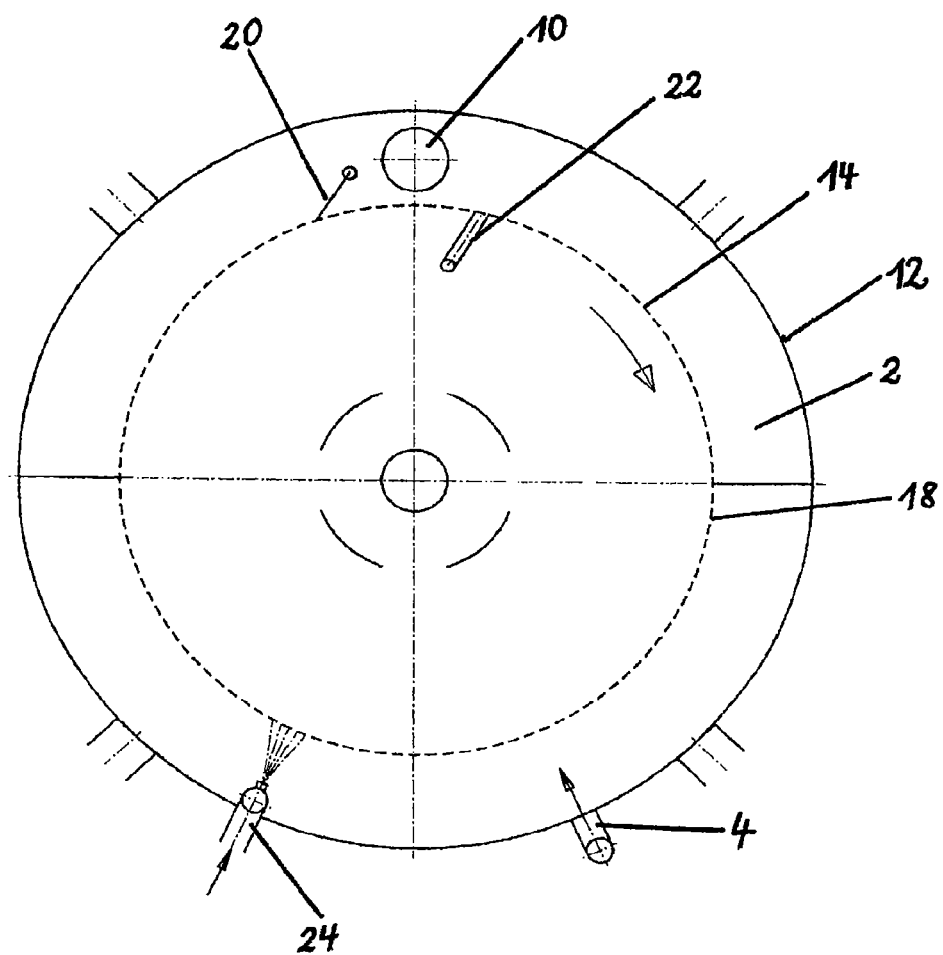
Figure 5:
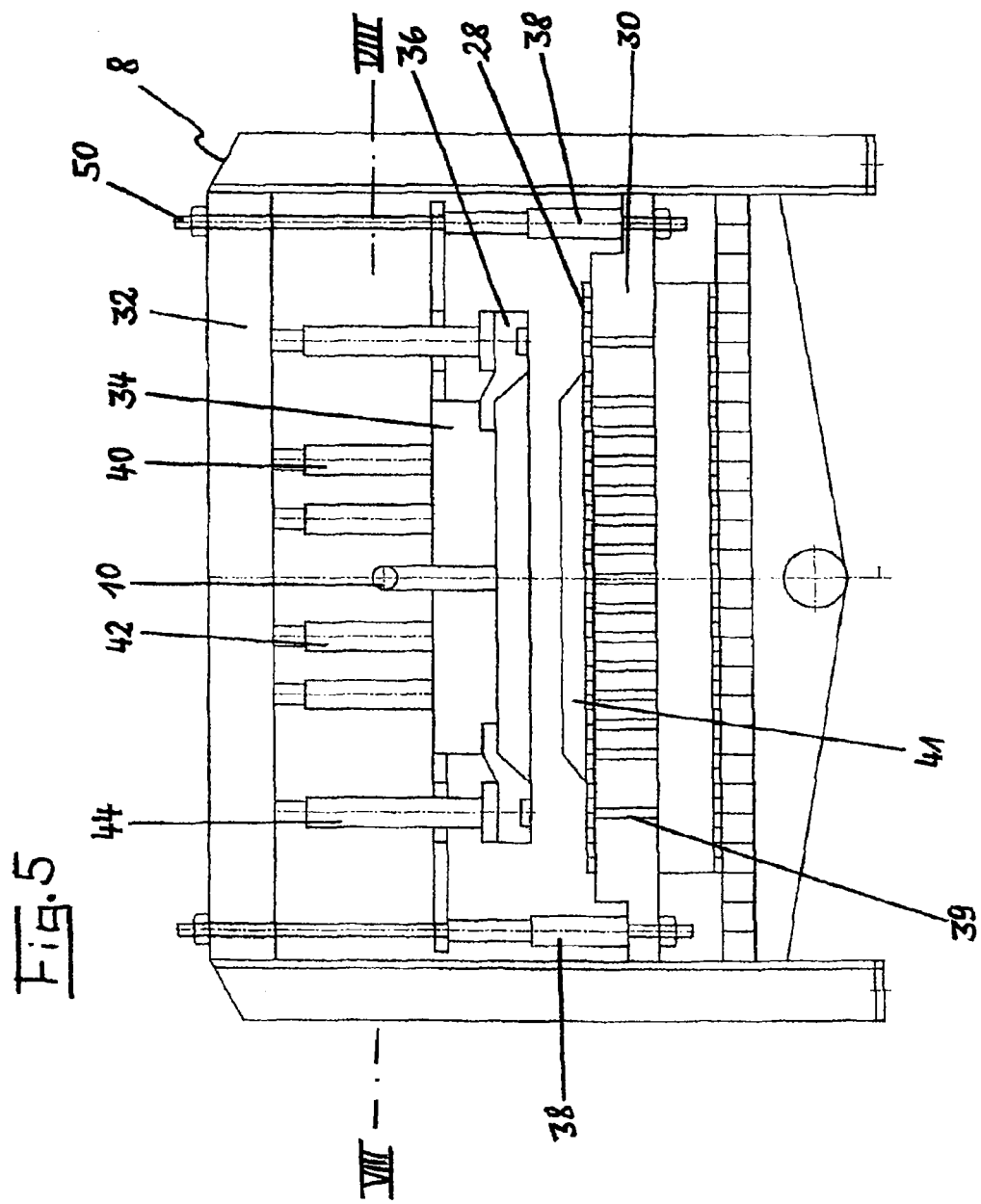
Figure 6:
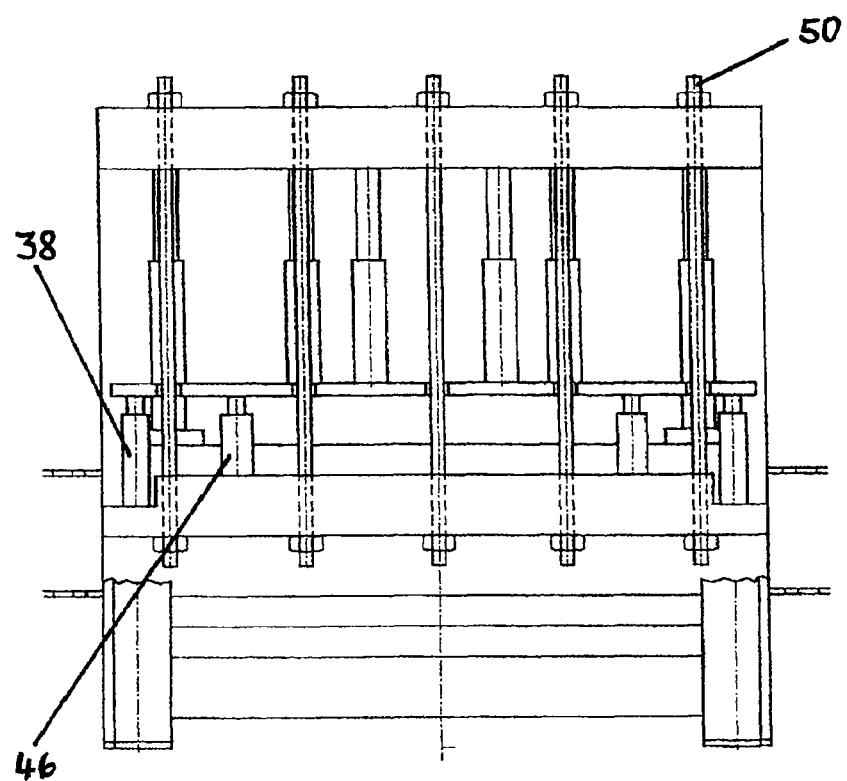

In the following, the invention is more detailedly described with reference to an exemplary embodiment shown in the drawings. In the drawings show:

FIG. 1 a lateral schematic view of the apparatus according to the invention partly in section;

FIG. 2 a top view of the apparatus according to FIG. 1;

FIG. 3 a schematic sectional view of the filtration chamber for the treatment of the material mixture by means of hydrostatic pressure;

FIG. 4 a sectional view of the filtration chamber according to FIG. 3 along the line IV-IV in FIG. 3;

FIG. 5 a schematic sectional view of a squeeze-pressure chamber in the opened position;

FIG. 6 the squeeze-pressure chamber in a lateral view;

FIG. 7 the squeeze-pressure chamber according to FIG. 5 in the closed state and, FIG. 8 a sectional view about in the plane VIII-VIII of FIG. 5.

As especially shown in FIGS. 1 and 2, the apparatus 1 according to the invention for performing the method of liquid-solid-separation of material mixtures and suspensions basically is consisting of two stages which are independent from each other with regard to the process, namely, a filtration chamber 2 having a feed 4 which on the solid matter side is connected to a pumping device 6 and one or more horizontally positioned squeeze-pressure chambers 8.

During the entire working time in the filtration chamber 2 the suspension to be dewatered is continuously fed pressureless and is dewatered with a hydrostatic pressure up to 0,2 bar which is based on the vertical position of the filtration chamber 2. During this procedure already 80 to 90% of the fed volume is removed as filtrate. The filtration chamber 2 remains closed during the entire working time and the separation of the fluid phase is not interrupted. The concentrated remaining volume is drawn off the filtration chamber 2 and is fed into the squeeze-pressure chambers 8 with a pumping pressure up to 5 bar by means of the pumping device 6. In the squeeze-pressure chambers 8 the liquid phase is separated by means of a squeezing pressure up to 50 bar. After finalizing the separation of the liquid phase or after washing the filter cake and renewed separation of the washing liquid for ejecting the filter cake all squeeze-pressure chambers 8 are opened simultaneously and the cake is removed from the squeeze-pressure chambers 8 horizontally by means of a filter belt more detailedly disclosed below. The switching time for opening the squeeze-pressure chambers, removing the filter cake, washing the filter belt and renewed closing the squeeze-pressure chambers merely is 30 seconds.

The apparatus 1 according to the invention combines in itself the advantages of continuous systems with the high dewatering pressure of discontinuous systems. The material mixture is fed into the filtration chamber 2 and simultaneously dewatered cake is removed from the squeeze-pressure chambers 8. This simultaneousness of dewatering and removal of the cake is a characterizing feature of all continuous dewatering systems. The apparatus therefore forms a continuously working high pressure press in which during the entire working time continuously without interruption the material mixture is fed into the filtration chamber 2 and the liquid phase is separated while the cake from the squeeze-pressure chambers 8 is removed batch-wise. The dewatering pressure and dewatering time in the squeeze-pressure chambers 8 is freely programmable corresponding to the dewatering behaviour of the respective material mixture. During the entire working time, however, the liquid phase is separated in the filtration chamber 2 and the squeeze-pressure chambers 8 simultaneously with different pressures and different treatment times.

The vertically positioned filtration chamber 2 schematically shown in FIGS. 3 and 4 is consisting of a fixed outside cylinder 12 and a rotatable inner filter basket cylinder 14. The cylinders 12 and 14 are having different diameters and are forming the closed filtration chamber 2 by means of the gap existing in between. The filter basket cylinder 14 is having a perforated shell 16 which is covered with a filter cloth 18. A solid matter stripper 20 on the outside is contacting the exterior of the filter cloth 18, wherein on the interior side of the filter basket cylinder 14 a contact brush 22 is provided which with the bristles thereof are engaging the holes of the shell 18. The solid matter stripper 20 and the contact brush 22 are extending over the entire height of the filter basket cylinder 14. During the rotation of the filter basket cylinder 14 the solid matter stripper 20 and the contact brush 22 activate and optimize the separation of the liquid phase. For cleaning the filter cloth 18 at the end of the work there additionally is provided a washer water nozzle manifold 24 by the means of which a washing liquid which is fed by a washing water feeding line 25 can be sprayed against the filter cloth 18.

A connection line 10 has the purpose to feed the concentrated remainder 5 volume from the filtration chamber 2 to the pumping device 6 schematically shown in FIG. 1. Numeral 23 in FIG. 3 further designates an outlet for the filtrate.

The squeeze-pressure chamber, shown in FIGS. 5 to 8, is forming a separate compact construction member per itself which, as shown in FIGS. 1 and 2, can be mounted deliberately next to each other in a modular fashion to increase the through-put of the apparatus 1 corresponding to the demand. Each squeeze-pressure chamber 8 is consisting of a lower fixed squeeze-pressure plate 30, an upper fixed counter-pressure plate 32, an upper liftable and lowerable squeeze-pressure plate 34, to which a seal 36 is fixed facing the lower fixed squeeze-pressure plate 30 and which is surrounding the squeeze-pressure chamber 8. Between the lower fixed squeeze-pressure plate 30 and the upper counter-pressure plate 32 tie rods 50 are provided which during the pressing of the liftable and lowerable pressure plate 24 against the lower fixed squeeze-pressure plate 30 are taking the tensional forces produced.

By a number of hydraulic cylinders, namely, opening cylinders 36, closing cylinders 40 and squeeze-pressure cylinders 42 merely the upper squeeze-pressure plate 34 with the seal 36 is moved and positioned.

Over the top side of the lower fixed squeeze-pressure plate 30 a circulating filter belt 28 (see FIG. 1) is guided which is running over all squeeze-pressure plates 30 in case several modular consecutive squeeze-pressure chambers 8 are used. After leaving the last squeeze-pressure chamber 8 the filter belt 28 is running through a drive/washing station 31 which is containing the dropping station 33 for the filter cake. Below all squeeze-pressure chambers 8 the filter belt 28 is guided back to the entry side of the first squeeze-pressure chamber 8 of the modular row in a tightening-reversing-control-station 35. During each cycle of the removal of the filter cake, the filter belt 28 of the squeeze-pressure chambers 8 is only making one half circulation between the drive washing station 31 and the tightening-reversing-control-station 35. Doing so, the filter belt 28 is cleaned on both sides by means of two washing water nozzle manifolds in the station 31.

The FIGS. 5 and 7 are showing the squeeze-pressure chamber 8 in its two basical positions, namely, on the one side the opened position according to FIG. 5 for removing the filter cake and cleaning the filter surfaces and, on the other hand, the closed position according to FIG. 7 in which the squeeze-pressure chamber 8 is filled and the separation of the fluid phase firstly is carried out under the action of the pressure created by the pumping device 6. In the lower fixed squeeze-pressure plate 30 on which the filter belt 28 is running, there are additionally provided channels 39 by the means of which the liquid phase separated within the squeeze-pressure plate 8 is removed.

As further especially can be learned from FIG. 5, the annular seal 36 which is fixed on the upper liftable and lowerable squeeze-pressure plate 34 which is surrounding the squeeze-pressure chamber 8 in the closed position thereof is provided with hydraulic pretensioning cylinders 44 which are supported on the upper fixed counter-pressure plate 32. By means of the pre-tensioning cylinders 44 the contact pressure of the seal 36 on the top side of the filter belt 28 can be deliberately adjusted corresponding to the pressure prevailing in the squeeze-pressure chamber 8 such that an absolute tightness of the squeeze-pressure chamber 8 is ensured at any time or at any respectively prevailing pressure, respectively.

Further, there are additionally provided limiting cylinders 46 by the means of which the stroke of the movable squeeze-pressure plate 34 in the closing direction is adjustable such that during the first phase of the separation of the liquid in the squeeze-pressure chamber 8 by means of the pressure delivered by the pumping device 6, which preferably is a worm extruder 29, it is possible to adjust the height of the squeeze-pressure chamber 8.

In the following, the working procedure of the apparatus 1 according to the FIGS. 1 to 8 is more detailedly described. FIG. 5 is showing the squeeze-pressure chamber 8 in the opened state, wherein the opening cylinders 38 have lifted the upper liftable and lowerable squeeze-pressure plate 34 with the seal 36 upwardly. The pretensioning cylinders 44 for the seal 36 are relieved, too, and are retracted. During the lifting of the upper squeeze-pressure plate 34 firstly the seal 36 has been lifted from the filter belt 28 by means of the pretensioning cylinders 44 and thereafter the entire squeeze-pressure plate 34 together with the seal 36 has been moved upwardly by the opening cylinders 38. Simultaneously the squeeze-pressure cylinders 42 are relieved.

In this state according to FIG. 5 the squeeze-pressure chamber 8 is ready to remove the filter cake formed in a previous cycle from the squeeze-pressure chambers by moving the filter belt 28. After dropping the filter cake off, then the squeeze-pressure plate shown in FIG. 5 has again returned to the state according to FIG. 5, wherein however no filter cake, which in FIG. 5 is having the reference numeral 41, is not contained in the squeeze-pressure chambers 8.

Thereafter the squeeze-pressure chamber 8 is transferred to the state according to FIG. 7, wherein the squeeze-pressure chambers of all modular units are closed. For this purpose, the opening cylinders 38 are relieved and the closing cylinders 40 are lowering the squeeze-pressure plate 34 together with the seal 36 downwardly. Doing so, the extent of the downward motion of the pressure plate 34 is limited by the limiting cylinders 46. Thereafter the pretensioning cylinders 44 are pressurized and the seal is pressed against the top side of the filter belt 28, i.e. quasi against the lower fixed squeeze-pressure plate 30 corresponding to the given demands. The squeeze-pressure chamber 8 therefore is ready to receive the material mix which has been concentrated to about 20 to 10% of the fed volume in the filtration chamber 2. During all previously described actions however the continuous feed of the material mix into the filtration chamber 2 is running together with the corresponding separation of the liquid phase. The concentrated remaining volume now is drawn off by the pumping device, i.e. the worm extruder 29, from the filtration chamber 2 and is fed into the individual squeeze-pressure chambers 8 through the connection line 10, where from the concentrated volume further the liquid phase is separated by the pumping pressure of about 5 bar created by the worm extruder, wherein the filtrate obtained during this procedure is drained off downwardly from the squeeze-pressure chambers 8 through the channels 41 with the interposed filter belt 28. Thereafter the connection line 10 leading to the worm extruder is closed by corresponding valves or slide gates (not shown) and with a prevailing pressure up to 50 bar the final separation of the liquid phase is carried out by pressing the upper liftable and lowerable squeeze-pressure plate 34 in the direction of the lower fixed squeeze-pressure plate 30 by means of the squeeze-pressure cylinders 42 and by therefore correspondingly decreasing the volume of the squeeze-pressure chambers 8. If necessary during this procedure, the contact pressure of the seal 36 can be increased by the pre-tensioning cylinders 44.

After the desired separation of the fluid phase in the squeeze-pressure chambers 8 has been achieved, the squeeze-pressure cylinders 42 are relieved, the pretensioning cylinders 44 are relieved and the opening cylinders 38 are activated. Thereafter the state shown in FIG. 5 is again reached and the squeeze-pressure chambers 8 therefore are ready for again beginning a cycle which, as described above, is starting with the removal and drop off of the filter cake 41 produced.

It is again referred to the fact that during the entire time the separation of the fluid phase in the filtration chamber is continuously carried out.

In the above description an embodiment of the invention has been described in detail, wherein modifications and alternations surely are obvious to an expert in the art which are within the scope of the present invention. All features and advantages of the invention which can be learned from the specification, the claims and the drawings including constructive details and positions in space can be important for the invention taken separately or in deliberate combination, too.

List of Reference Numerals

1=apparatus
2=filter chamber
3=feed
6=pumping device
8=squeeze-pressure chamber
10=connection line
12=outside cylinder
14=filter basket cylinder
16=shell
18=filter cloth
20=solid matter stripper
22=contact brush
23=filtrate outlet
24=washing water nozzle manifold
25=washing water inlet line
28=filter belt
29=worm extruder
30=lower fixed squeeze pressure plate
31=drive washing station
32=upper fixed counter-pressure plate
33=dropping station
34=risible and lowerable squeeze pressure
35=tightening-reversing-control station
36=seal
37=washing water nozzle manifolds
38=opening cylinder
39=channels
40=closing cylinder
41=filter cake
42=squeeze-pressing-cylinder
44=pre-tensioning cylinder for 36
46=limiting cylinder
48=washing device
50=tie rod

The invention claimed is:

1. An apparatus for separating a solid-liquid mixture comprising:
    a filter chamber (2) for receiving said solid-liquid mixture, said filter chamber (2) including a fixed outside cylinder (12) and an inner perforated rotatable cylindrical filter basket (14) the exterior surface of which is covered with a filter cloth (18), an annular volume being defined between said fixed outside cylinder (12) and said cylindrical filter basket (14), said filter chamber further including an outer solid matter stripper (20), an inner contact brush (22) and a filtrate outlet (23);
    a worm extruder pump (29), an inlet of which is in fluid communication with said annular volume;
    at least one variable volume, squeeze-pressure chamber (8), including:
        a lower fixed squeeze-pressure plate (30);
        an upper fixed counter-pressure plate (32);
        a filter belt (28);
        an upper liftable and lowerable squeeze-pressure plate (34) having a surrounding seal (36);
        tie rods (50) between the lower squeeze-pressure plate (30) and upper fixed counter-pressure plate (32) for taking the tensional forces; and
        hydraulic cylinders (38, 40, 42) for moving the upper squeeze-pressure plate (34) together with the seal (36)
    wherein a continuous feed (4) introduces said solid-liquid mixture into said annular volume, wherein filtrate passes though said filter cloth (18) and said inner perforated rotatable cylindrical filter basket (14) into an interior volume defined by said cylindrical filter basket (14) and exits through said filtrate outlet (23), while a concentrated volume of the remaining solid-liquid mixture flows into said worm extruder pump (29) which then transports said remaining concentrated volume to said at least one variable volume squeeze-pressure chamber (8) through a connection line (10), where the remaining concentrated volume of the solid liquid mixture is further separated by the pumping pressure created by the worm extruder, wherein filtrate passes through filter belt (28) and is drained off downwardly from the squeeze-pressure chamber (8) through channels (39) in said lower fixed squeeze-pressure plate (30) leaving a filter cake (41) on said filter belt (28).

2. The apparatus according to 1, wherein said filter cake (41) on said filter belt (28) in said squeeze-pressure chamber (8) is further pressed with up to 50 bar by pressing the upper liftable and lowerable squeeze-pressure plate (34) in the direction of the lower fixed squeeze-pressure plate (30) using said hydraulic cylinders (42).

* * * * *